US011143035B2

(12) United States Patent
Place et al.

(10) Patent No.: US 11,143,035 B2
(45) Date of Patent: Oct. 12, 2021

(54) ANGLED TIP RODS

(71) Applicant: United Technologies Corporation, Farmington, CT (US)

(72) Inventors: Emma J. Place, New Hartford, CT (US); Carlos Calixtro, Atlanta, GA (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 93 days.

(21) Appl. No.: 16/654,674

(22) Filed: Oct. 16, 2019

(65) Prior Publication Data

US 2021/0115799 A1  Apr. 22, 2021

(51) Int. Cl.
*B22C 9/10* (2006.01)
*F01D 5/14* (2006.01)
*B22D 25/02* (2006.01)

(52) U.S. Cl.
CPC .............. *F01D 5/147* (2013.01); *B22C 9/103* (2013.01); *B22D 25/02* (2013.01); *F05D 2220/32* (2013.01); *F05D 2230/50* (2013.01)

(58) Field of Classification Search
CPC .............. B22C 9/00; B22C 9/10; B22C 9/103
See application file for complete search history.

(56) References Cited

U.S. PATENT DOCUMENTS

| 6,915,840 B2 | 7/2005 | Devine, II et al. |
| 6,929,054 B2 | 8/2005 | Beals et al. |
| 7,562,691 B2 | 7/2009 | Guerche et al. |
| 2008/0164001 A1 | 7/2008 | Morris et al. |
| 2015/0132139 A1* | 5/2015 | Tran ............ B22C 9/103 416/223 A |

FOREIGN PATENT DOCUMENTS

| EP | 2942488 A1 | 11/2015 |
| EP | 3354853 A1 | 8/2018 |
| FR | 3072415 A1 | 4/2019 |

OTHER PUBLICATIONS

European Search Report Application No. EP20202401; dated Feb. 12, 2021; pp. 10.

* cited by examiner

*Primary Examiner* — Kevin P Kerns
*Assistant Examiner* — Steven S Ha
(74) *Attorney, Agent, or Firm* — Cantor Colburn LLP

(57) ABSTRACT

A core is provided for fabricating a blade to include an airfoil. The airfoil includes pressure and suction surfaces, leading and trailing edges extending along the pressure and suction surfaces and a tip shelf with a first sweep configuration and a wall. The core includes channel sections configured to form internal channels within the airfoil by casting processes and tip rods extending from respective portions of the channel sections proximate to a tip shelf location. The respective portions of the channel sections have a second sweep configuration corresponding to the first sweep configuration. The tip rods are configured to extend through the wall at an angle of about 5-12 degrees inclusive relative to a normal angle of the wall during the casting processes to form through-holes angled at about 5-12 degrees inclusive in the wall.

5 Claims, 6 Drawing Sheets

ANGLED TIP RODS

BACKGROUND

Exemplary embodiments of the present disclosure relate generally to gas turbine engines and, in one embodiment, to angled tip rods used to cast holes in tips of blade cores of turbine blades of gas turbine engines.

Airfoils are present in many aerodynamic applications including, but not limited to, turbines of gas turbine engines. These turbine airfoils each have a root, a tip, pressure and suction surfaces that extend from root to tip and leading and trailing edges at leading and trailing sides of the pressure and suction surfaces. In a turbine, the turbine airfoils or turbine blades can aerodynamically interact with high temperature and high pressure fluids to cause a rotor to rotate.

During operations, gas turbine engines ingest dirt and this dirt travels through the compression system and the combustor and into the cores of the turbine blades where the dirt and air is flung or pumped to the outer diameters or tips of the turbine blades. Typically, the majority of the dirt particles are extremely fine and flows within the cooling air streams that are used to cool the internals of the turbine blades. However, in some cases, the dirt particles are too large to make the abrupt turns inside the internal passages of the turbine blades and they adhere to the outermost surfaces of the turbine blade internals. This can result in an accumulation of dirt on those outermost surfaces and, at given temperatures, can cause premature metallurgical degradation as well as create unwanted insulated areas within the airfoil. The accumulation of dirt can also tend to increase the tip pull of the turbine blades thus reducing the structural integrity of the blade root and disk lugs and altering the expected structural and vibration responses of the turbine blade.

Therefore, it is common practice to have at least one relatively large hole at the tip of the core of each turbine blade. This hole allows entrained relatively large dirt particles to escape out of the turbine blade and into the gas path and out the back of the gas turbine engine.

The holes are typically cast using alumina or quartz rods.

During turbine blade investment casting processes, the alumina or quartz rods can also be used as core position control features to assist in casting core leaching. Cores of turbine blades (or blade cores) shift around during the casting process so it is necessary to provide tip features that allow control of blade core shift in all directions. This is especially important in multi-core blade designs where both hot and cold walls and internal blade core ribs must be protected. Tip rods can be used as blade core locators to control radial, axial and tangential shifts of blade cores. When one blade core has multiple tip rods extending out of the tip, they are often connected by a tip plenum that extends outside of the final machined part. The tip plenum helps to provide core stability by controlling internal blade core ribs and can also be used as a blade core locator in conjunction with the tip rods.

Blade core leaching is also a concern in complex blade core designs with multiple dead end cavities. Alumina or quartz rods can be used to assist in casting blade core leaching by being embedded into dead end cavities and extending outside of the finished casting. This creates a path for the ceramic blade core to exit the part during leaching. If rods cannot be used, internal core ties are often required that connect multiple blade core cavities together that would alter the cooling scheme of the turbine blade and, due to sizing requirements, may negatively impact part durability.

Alumina and quartz tip rods should meet specific sizing requirements in order to ensure cast-ability. These requirements include meeting a minimum rod diameter (e.g., about 0.035" for quartz rods), meeting a maximum unsupported length (e.g., about 1.5× the rod diameter) and the fact that rods should be embedded into blade core material by a minimum distance (e.g., about 0.065"-0.100"). In addition, rods must be surrounded by 0.025" of blade core thickness.

In turbine blade airfoils with a sweep at the tip, radially oriented rods often do not meet producible tip rod sizing criteria, such as specifically embedded length and core thickness requirements, due to the curvature of the blade cores at the tip. The tip rods that are incorporated and that do not meet sizing criteria are highly likely to break during casting causing increased scrap.

Accordingly, it is necessary to devise tip rod geometry that can be used in turbine blades with an airfoil sweep that meets producible tip rod sizing criteria.

BRIEF DESCRIPTION

According to an aspect of the disclosure, a core is provided for fabricating a blade to include an airfoil. The airfoil includes pressure and suction surfaces, leading and trailing edges extending along the pressure and suction surfaces and a tip shelf with a first sweep configuration and a wall. The core includes channel sections configured to form internal channels within the airfoil by casting processes and tip rods extending from respective portions of the channel sections proximate to a tip shelf location. The respective portions of the channel sections have a second sweep configuration corresponding to the first sweep configuration. The tip rods are configured to extend through the wall at an angle of about 5-12 degrees inclusive relative to a normal angle of the wall during the casting processes to form through-holes angled at about 5-12 inclusive in the wall.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the channel sections include a bumper proximate to an internal end of at least one of the tip rods.

In accordance with additional or alternative embodiments, external ends of the tip rods are coupled to a plenum body.

According to another aspect of the disclosure, a method of assembling a core for fabricating a blade is provided such that the blade includes an airfoil. The airfoil includes pressure and suction surfaces, leading and trailing edges extending along the pressure and suction surfaces and a tip shelf with a first sweep configuration and a wall. The method includes forming channel sections configured to form internal channels within the airfoil by casting processes, disposing tip rods to extend from respective portions of the channel sections proximate to a tip shelf location, the respective portions of the channel sections having a second sweep configuration corresponding to the first sweep configuration and executing the casting processes to cast the blade whereby the tip rods extend from the internal channels and through the wall at an angle of about 5-12 inclusive relative to a normal angle of the wall to form through-holes angled at about 5-12 degrees inclusive in the wall.

In accordance with additional or alternative embodiments, the method further includes forming a squealer pocket in the tip shelf.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the forming of the channel sections includes forming a bumper proximate to an internal end of at least one of the tip rods.

In accordance with additional or alternative embodiments, the method further includes coupling external ends of the tip rods to a plenum body.

In accordance with additional or alternative embodiments, the executing of the casting process includes executing an investment casting process to cast the blade around the core and to remove the core and the method further includes removing the tip rods from the blade via the through-holes in the wall upon completion of the investment casting process.

According to another aspect of the disclosure, a blade structure is provided and includes tip rods and an airfoil. The airfoil includes pressure and suction surfaces, leading and trailing edges extending along the pressure and suction surfaces and a tip shelf with a sweep configuration and a wall. The airfoil defines internal channels and the tip rods extend from the internal channels and through the wall at an angle of about 5-12 inclusive relative to a normal angle of the wall.

In accordance with additional or alternative embodiments, the airfoil extends from a platform interposed between a root and the airfoil.

In accordance with additional or alternative embodiments, the sweep configuration is characterized as a sweep of the tip shelf relative to a rest of the airfoil.

In accordance with additional or alternative embodiments, the tip shelf defines a squealer pocket.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the airfoil further includes internal components defining the internal channels and one of the internal components proximate to an internal end of at least one of the tip rods defines a divot.

In accordance with additional or alternative embodiments, the tips rods are removable from the airfoil via through-holes formed in the wall by the tip rods

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
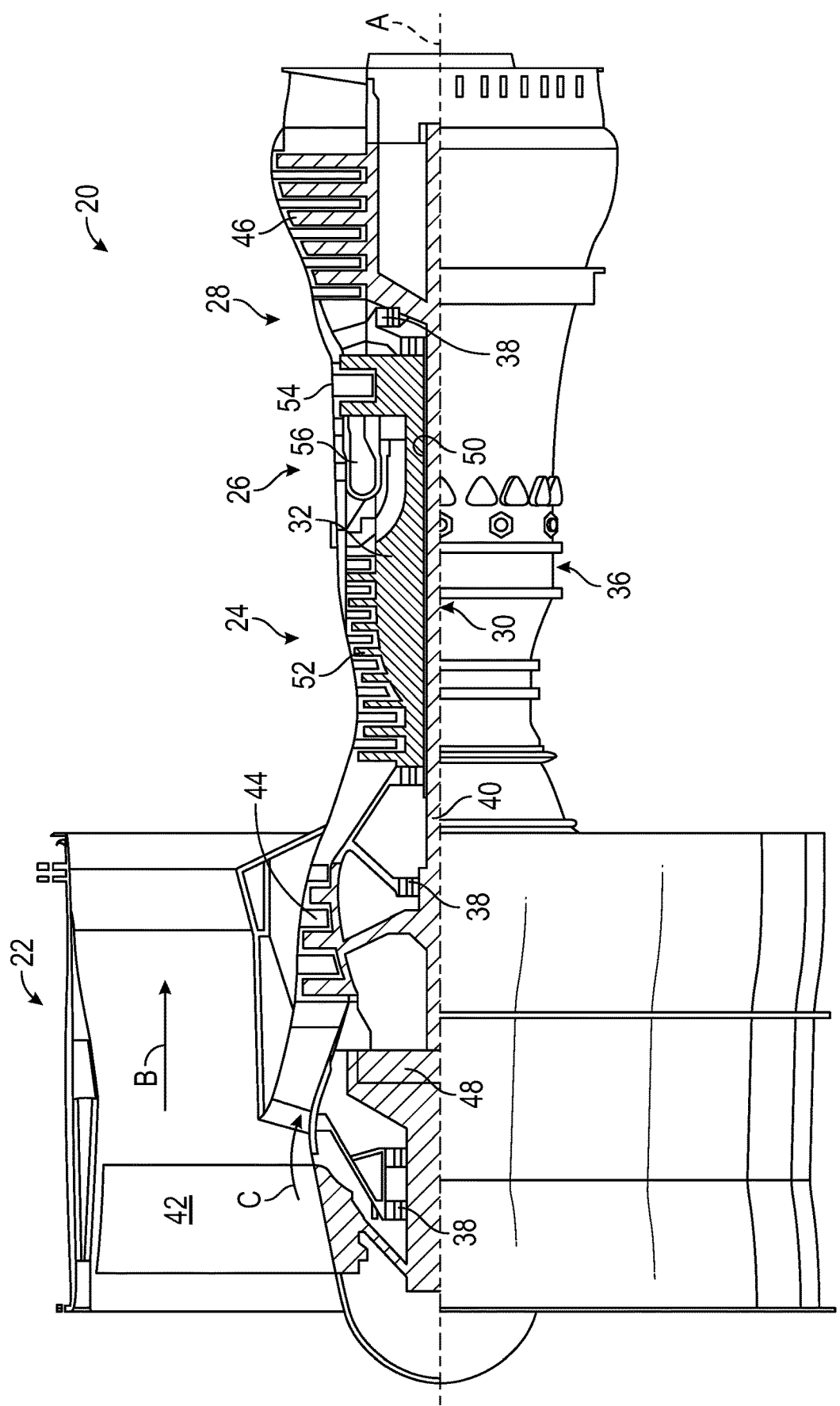
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

As will be described below, a tip rod geometry is provided for use in turbine blades with an airfoil sweep that meets producible tip rod sizing criteria. The tip rods are made of alumina or quartz and are located at the tip of a blade core at an angle. In locations where embedded rod lengths can be met but core thicknesses around the rod are not met, additional core support features, such as bumpers, can be used to meet producibility criteria and to add additional wall thickness controls.

Figure 2:
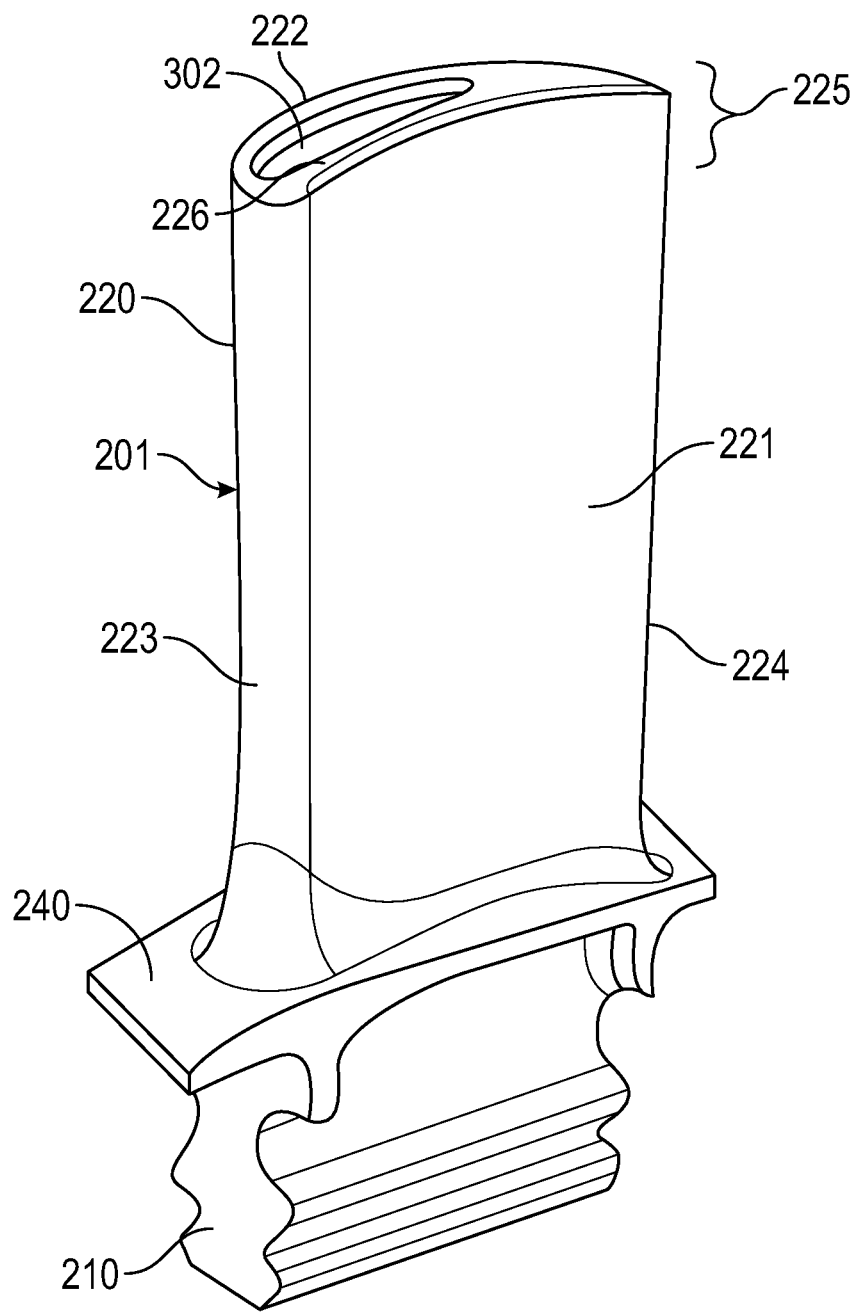
FIG. 2 is a perspective view of a turbine blade of a turbine section of a gas turbine engine in accordance with embodiments.
Figure 3:
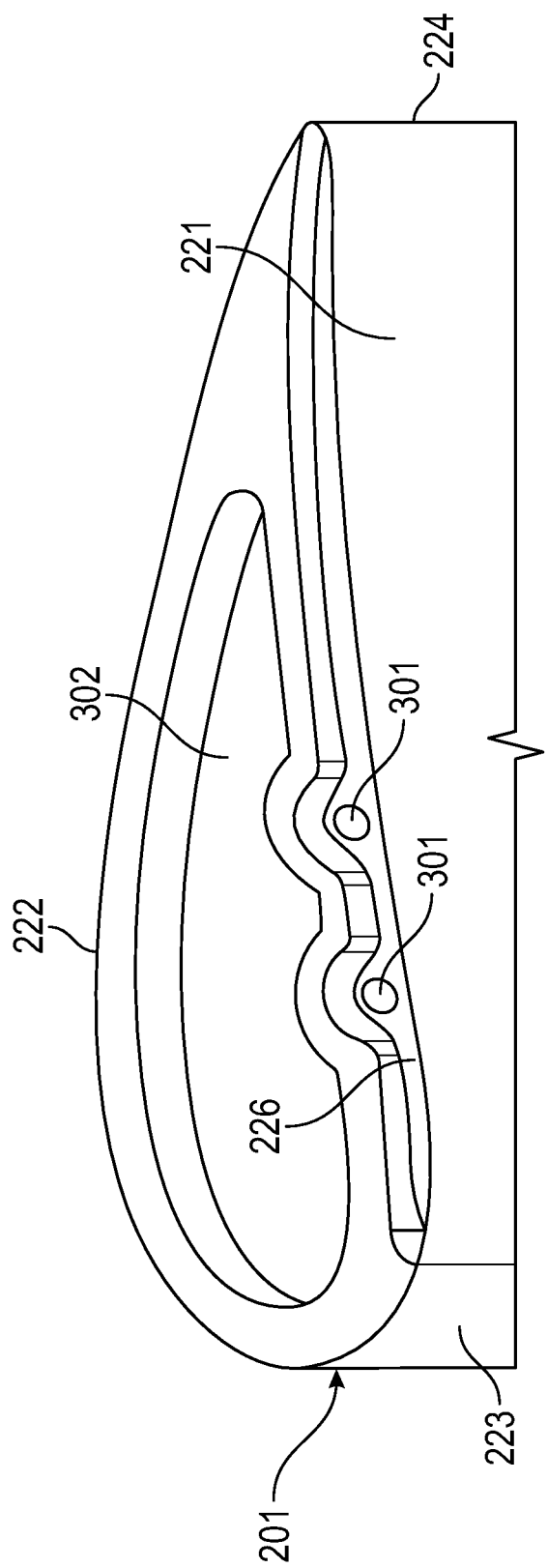
FIG. 3 is an enlarged perspective view of a tip shelf of the turbine blade of FIG. 2 in accordance with further embodiments.

With reference to FIGS. 2 and 3, a turbine blade 201 is provided for use in at least the compressor section 24 and the turbine section 28 of the gas turbine engine 20 of FIG. 1.

The turbine blade 201 includes a root 210 with a dovetail or fir tree cross-section, an airfoil 220 and a platform 240 that is radially interposed between the root 210 and the airfoil 220. The airfoil 220 extends radially outwardly from the platform 240 and includes a pressure surface 221, a suction surface 222 opposite the pressure surface 221, leading and trailing edges 223 and 224 extending along leading and trailing ends of the pressure and suction surfaces 221 and 222 and a tip shelf 225 at a distal end of the airfoil 220. The tip shelf 225 has a first sweep configuration 701, which is characterized as a sweep of the tip shelf 225 relative to the rest of the airfoil 220 (see FIG. 7), and a wall 226. The airfoil 220 is formed to define internal channels 702 (see FIG. 7), which will be described below, and the wall 226 is formed to define obliquely-angled through-holes 301 (see FIG. 3), which will also be described below. The obliquely-angled through-holes 301 are defined at an oblique angle α (see FIG. 7) relative to a normal angle of the wall 226.

In accordance with embodiments, the angle α can be about 5 degrees or slightly less, 5-12 degrees inclusive or about 12 degrees or slightly more.

As shown in FIG. 3, the tip shelf 225 is formed to define a squealer pocket 302. The obliquely-angled through-holes 301 can be defined adjacent to a wall surrounding the squealer pocket 302 and along the pressure surface 221.

Figure 4:
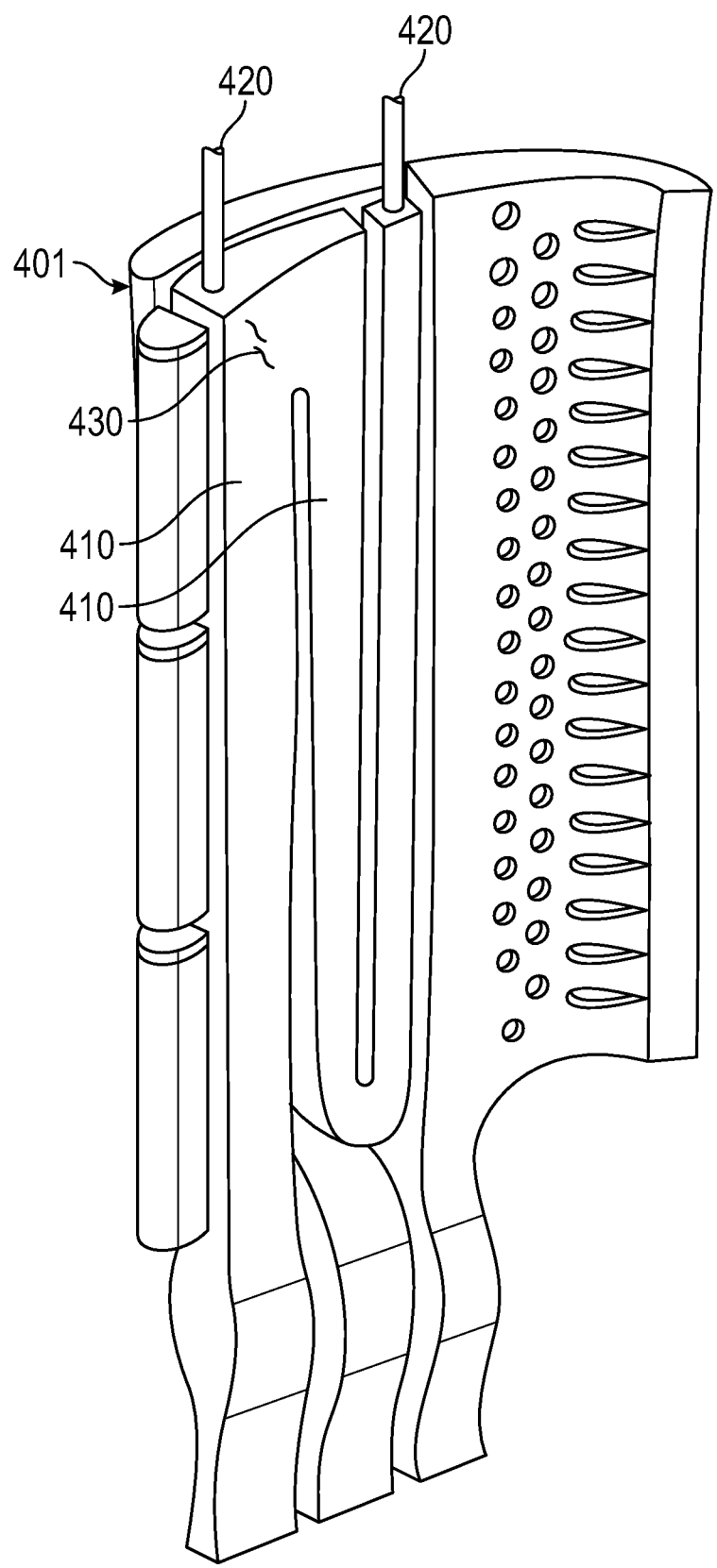
FIG. 4 is a perspective view of a core for fabricating the turbine blade of FIGS. 2 and 3 in accordance with embodiments.

With continued reference to FIGS. 2 and 3 and with additional reference to FIG. 4, a core 401 is provided for use in fabricating a blade, such as the turbine blade 201 of FIGS. 2 and 3, to include the features of the airfoil 220 described above using casting processes which will be described below. The core 401 includes channel sections 410 and tip rods 420. The channel sections 410 are configured to form the internal channels 702 (see FIG. 7) within the airfoil 220 by the casting processes. The tip rods 420 are disposed to extend from respective portions of the channel sections 410 that are located proximate to a location of the tip shelf 225 once the tip shelf 225 is eventually formed by the casting processes. That is, the tip rods 420 extend radially outwardly from distal ends of the respective portions of the channel sections 410. The respective portions of the channel sections 410 have a second sweep configuration 430 that corresponds to the first sweep configuration 701 (see FIG. 7). The tip rods 420 are configured to extend from the respective portions of the channel sections 410 or the internal channels 702 (see FIG. 7) and through the wall 226 once the tip shelf 225 and the wall 226 are eventually formed by the casting processes at the oblique angle α (i.e., about 5 degrees) relative to a normal angle of the wall 226 during the casting processes. The tip rods 420 cause the obliquely-angled through-holes 301 to form in the wall 226.

In accordance with embodiments, the tip rods 420 can include at least one or more of alumina and quartz.

In accordance with further embodiments, the channel sections 410 can include a bumper 430 proximate to an internal end of at least one of the tip rods 420.

Figure 5:
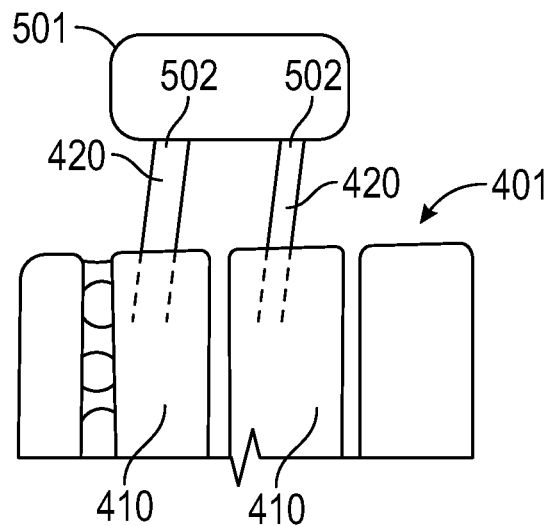
FIG. 5 is an enlarged, schematic side view of a portion of the core of FIG. 4 in accordance with embodiments.

With reference to FIG. 5, a plenum body 501 can be provided and external ends 502 of the tip rods 420 can be coupled to the plenum body 501.

Figure 6:
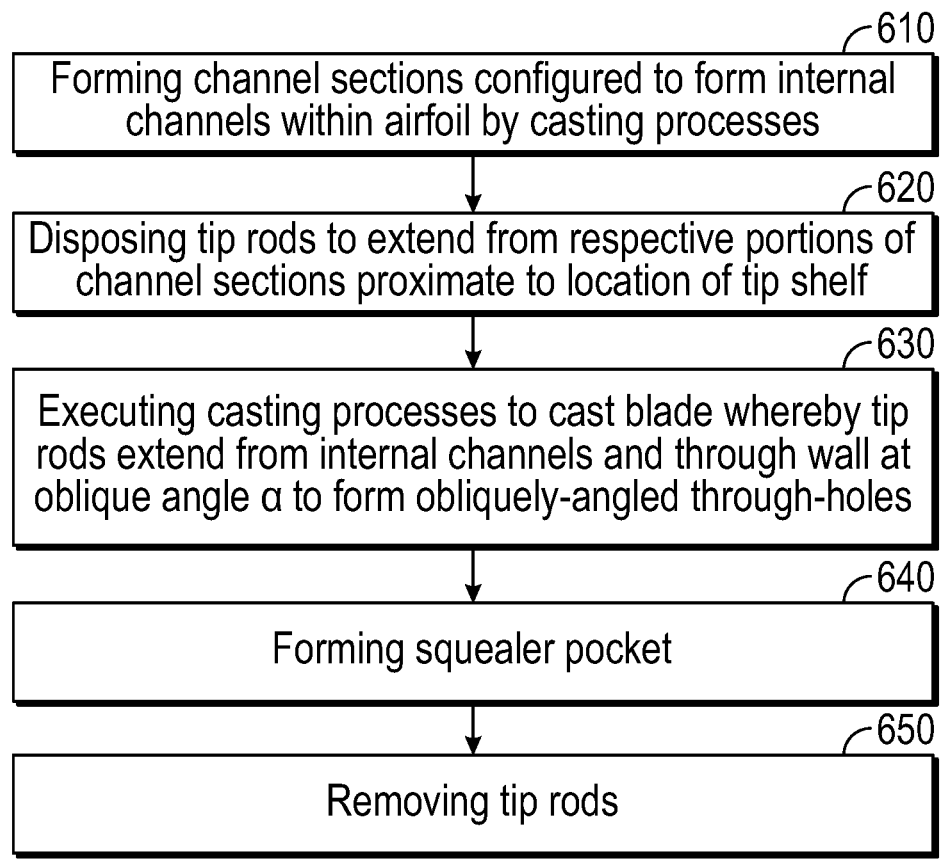
FIG. 6 is a flow diagram illustrated a method of assembling a core for fabricating a blade in accordance with embodiments.

With continued reference to FIGS. 2-5 and with additional reference to FIG. 6, a method of assembling the core 401 (see FIG. 4) is provided. As shown in FIG. 6, the method includes forming the channel sections 410 such that the channel sections 410 are configured to form the internal channels 702 (see FIG. 7) within the airfoil 220 by casting processes (block 610), disposing the tip rods 420 to extend from the respective portions of the channel sections 410 proximate to the location of the tip shelf 225 (block 620) and executing the casting processes to cast the blade whereby the tip rods 420 extend from the internal channels 702 and through the wall 226 at the oblique angle α relative to the normal angle of the wall 226 to form the obliquely-angled through-holes 301 in the wall 226 (block 630). The method can further include forming the squealer pocket 302 in the tip shelf 225 (block 640).

The executing of the casting processes of block 630 can include executing an investment casting process to cast the blade around the core 401 and to subsequently remove the core 401 from the blade once the blade is cast. This can be achieved by known methods and processes for casting and results in the definition and the formation of the airfoil 220 and the internal channels 702. The method can further include removing the tip rods 420 from the blade via the obliquely-angled through-holes 301 in the wall 226 upon completion of the investment casting process (block 650).

In accordance with embodiments, the method can also include forming the bumper 430 proximate to the internal end of at least one of the tip rods 420 and coupling the external ends of the tip rods 420 to the plenum body 501.

Figure 7:
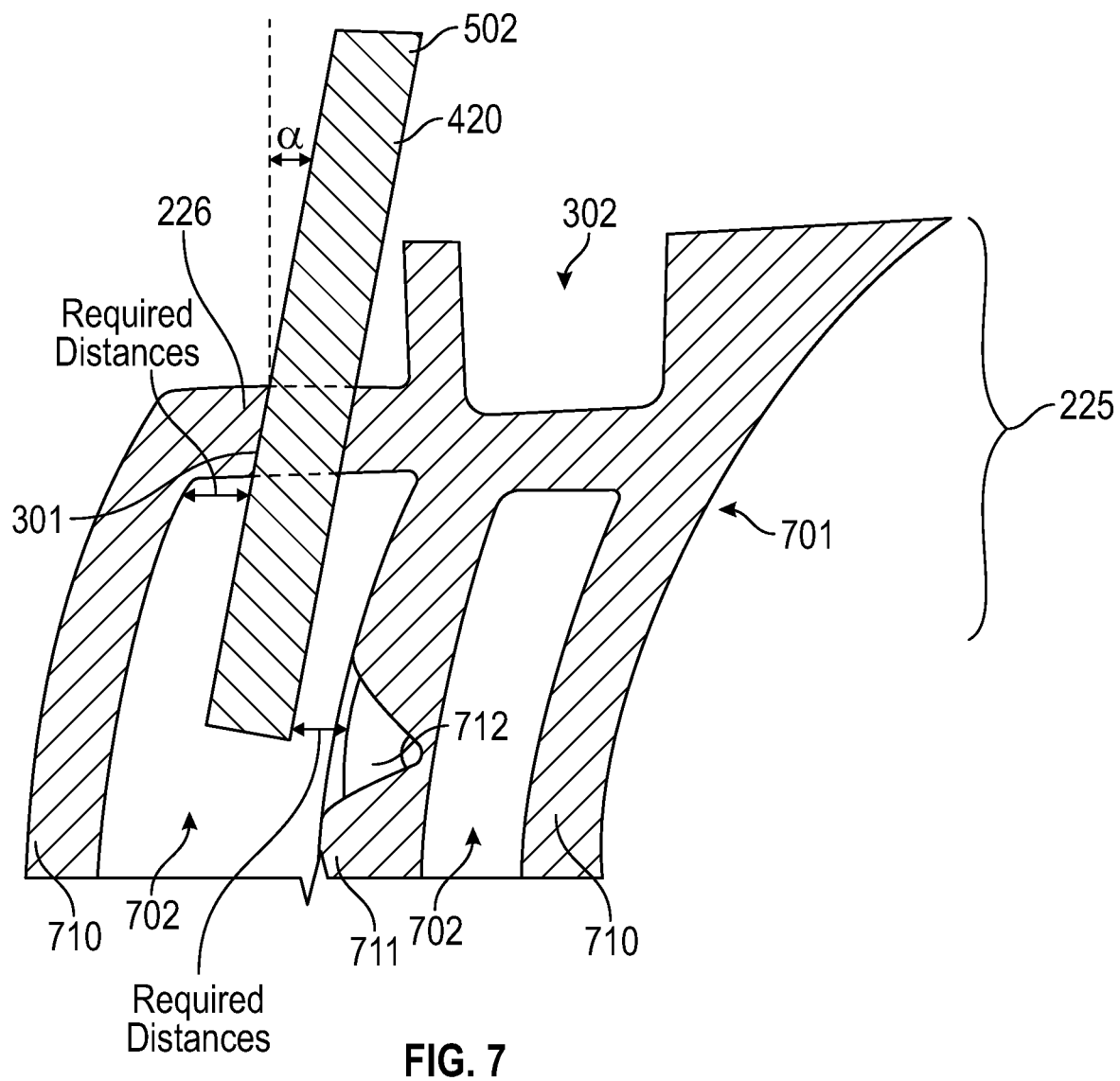
FIG. 7 is a front view of a portion of a blade structure during an investment casting process to form the turbine blade of FIGS. 2 and 3 in accordance with embodiments.

With reference to FIG. 7, a blade structure 700 is provided. The blade structure 700 is essentially an intermediate stage structure which exists during the casting processes and includes the tip rods 420 and the airfoil 220 as each is described above. The airfoil 220 has the first sweep configuration 701 and is formed to define the internal channels 702. Here, the core 401 has already been removed by the completion of the investment casting process noted above with the airfoil 220 left remaining and intact whereby the core 401 includes the wall 226 as well as external passage wall components 710 and internal passage wall components 711 that were formed by the channel sections 410. The tip rods 420 extend from the internal channels 702 and through the wall 226 at the oblique angle α relative to the normal angle of the wall 226 to thus form the obliquely-angled through-holes 301 during the casting processes and are removable via the obliquely-angled through-holes 301.

With the tip rods 420 extending through the wall 226 at the oblique angle α, distances between the tip rods 420 and the external and internal passage wall components 710 and 711 can be maintained at or above minimum required distances with the tip rods 420 still having reliably producible dimensions and sizes of the obliquely-angled through-holes 301 being maintained at or above minimum required sizes.

In accordance with embodiments, at least one or more of the internal passage wall components 711 proximate to the internal end of at least one of the tip rods 420 can be formed to define a divot 712. The divot results from the investment casting process and the formation of the bumper 430 (see FIG. 4). To an extent the internal end of the at least one of the tip rods 420 is excessively close to the internal passage wall component 711, the divot 712 serves to recapture the minimum required distance.

Benefits of the features described herein allows for the use of tip rods to produce holes for internal cavity dirt purge, core position control and casting core leaching in blades with an airfoil sweep.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A core for fabricating a blade to comprise an airfoil, the airfoil comprising pressure and suction surfaces, leading and trailing edges extending along the pressure and suction surfaces and a tip shelf with a first sweep configuration and a wall, the core comprising:
    channel sections configured to form internal channels within the airfoil by casting processes; and
    tip rods extending from respective portions of the channel sections proximate to a tip shelf location,
    wherein the respective portions of the channel sections having a second sweep configuration corresponding to the first sweep configuration and the tip rods being configured to extend through the wall at an angle of about 5-12 degrees inclusive relative to a normal angle of the wall during the casting processes to form through-holes angled at about 5-12 degrees inclusive in the wall.

2. The core according to claim 1, wherein the tip rods comprise at least one or more of alumina and quartz.

3. The core according to claim 1, wherein the angle is 5 degrees relative to the normal angle of the wall.

4. The core according to claim 1, wherein the channel sections comprise a bumper proximate to an internal end of at least one of the tip rods.

5. The core according to claim 1, further comprising a plenum body to which external ends of the tip rods are coupled.

* * * * *